Jan. 6, 1942.  S. OLSON  2,268,896

AUTOMATIC CONVEYER MECHANISM

Filed Feb. 10, 1940  4 Sheets-Sheet 1

Inventor
Samuel Olson
by [signature]
his Attorneys.

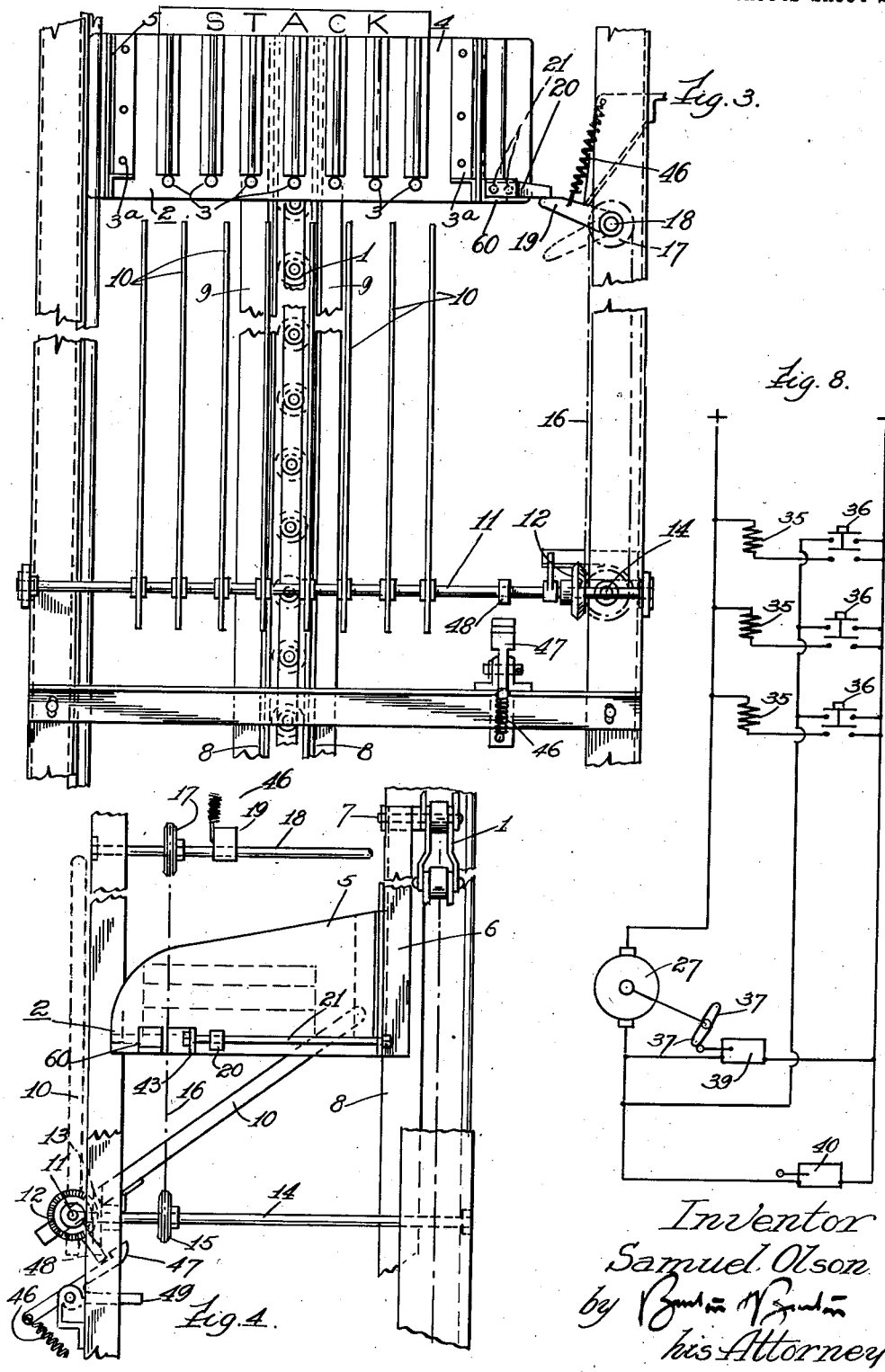

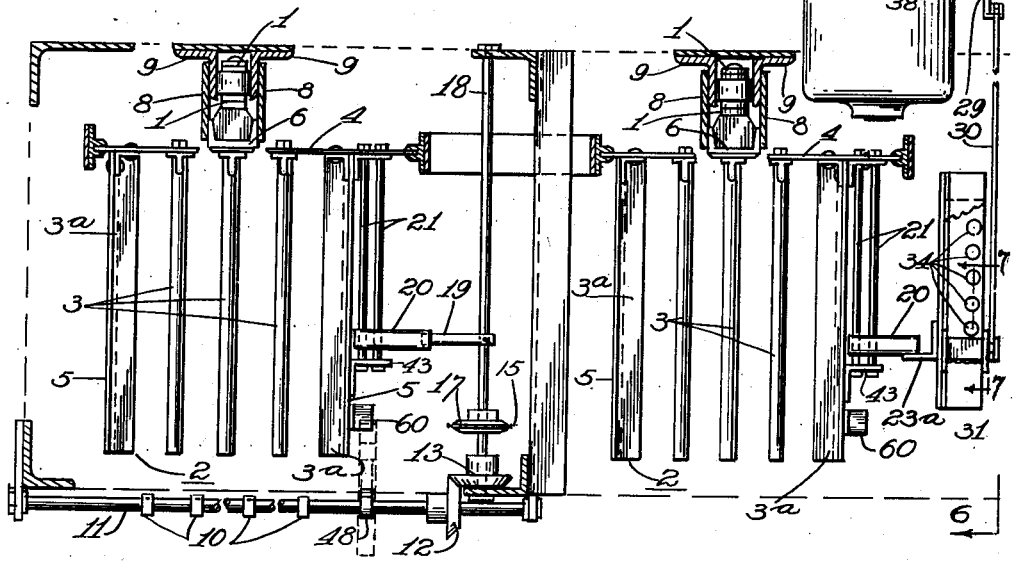

Jan. 6, 1942.  S. OLSON  2,268,896
AUTOMATIC CONVEYER MECHANISM
Filed Feb. 10, 1940  4 Sheets-Sheet 4
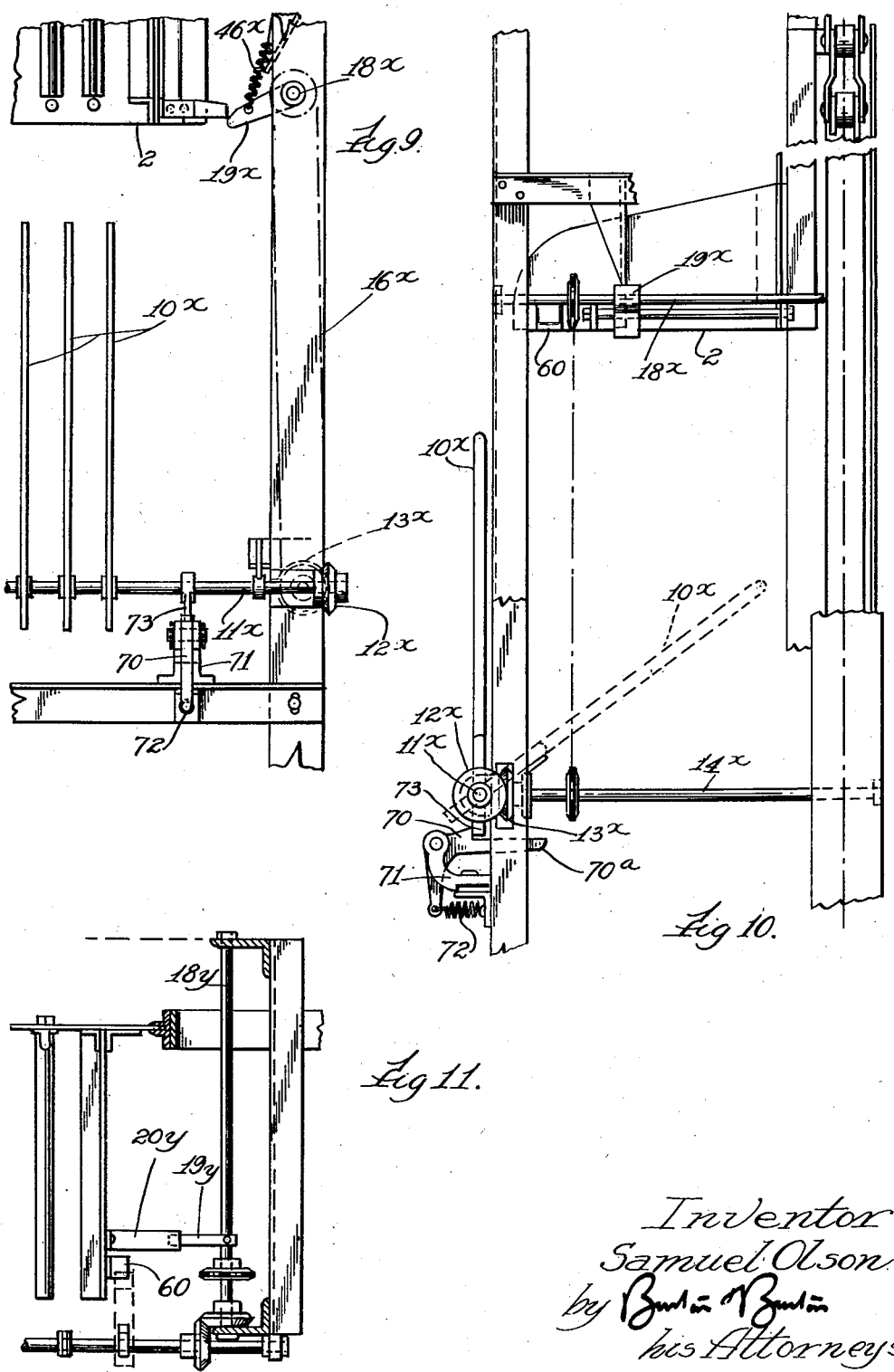
Inventor
Samuel Olson
by Burton & Burton
his Attorneys Patented Jan. 6, 1942

2,268,896

UNITED STATES PATENT OFFICE 2,268,896

AUTOMATIC CONVEYER MECHANISM

Samuel Olson, Chicago, Ill.

Application February 10, 1940, Serial No. 318,283

10 Claims. (Cl. 198—38)

This invention relates to conveying machinery, and is particularly concerned with automatic mechanism for discharging loads from the carriers of the conveyer at different stations as predetermined by selective means associated with the carriers. The invention is shown as applied to a relatively simple type of conveyer designed to operate as an elevator for transporting books or similar articles between several floors in a library building or the like. And in the particular embodiment herein described it is assumed that there is a principal loading station provided with selective means and associated with the upwardly traveling portion of the conveyer, and a plurality of discharge stations disposed along the downwardly traveling portion so that loads are conveyed by the carriers of the elevator upwardly from the loading station and over the head wheel at the top of the elevator, and thence downwardly for discharge. The invention includes automatic unloading devices at each of the discharge stations, normally inactive, but each having a trip mechanism by which it may be thrown into active position; and each of the carriers is fitted with a shiftable selector member which may be adjusted by the selective means at the loading station in position to actuate any selected unloader as the carrier arrives at the chosen station. The invention consists in various features and elements of construction in combination, as herein shown and described and as indicated by the claims.

In the drawings:

Fig. 3 is a front view of a delivery station showing an approaching carrier positioned for tripping the unloading mechanism into active position.

Fig. 4 is a fragmentary side view showing the unloading mechanism latched in active position relative to a carrier of the conveyer.

Fig. 5 is a horizontal section showing a descending carrier in the same position as in Fig. 3, and showing an ascending carrier adjacent the selector setting mechanism at the loading station, certain parts being broken out to condense the view.

Fig. 6 is a side elevation of the selector setting mechanism, being taken as indicated at line 6—6 on Fig. 5.

Fig. 7 is a detail section taken substantially at line 7—7 on Fig. 5, to show the selective stop means for the adjustable shifter.

Fig. 8 is a wiring diagram for the motor and control devices which operate the selector setting mechanism.

Fig. 9 is a fragmentary front elevation showing the unloader mechanism at normal inactive position at the "desk" station of a library system.

Fig. 10 is a fragmentary side elevation of the parts shown in Fig. 9.

Fig. 11 is a fragmentary plan section illustrating a modified arrangement for the unloader at a "desk" station in a library.

Figure 1:
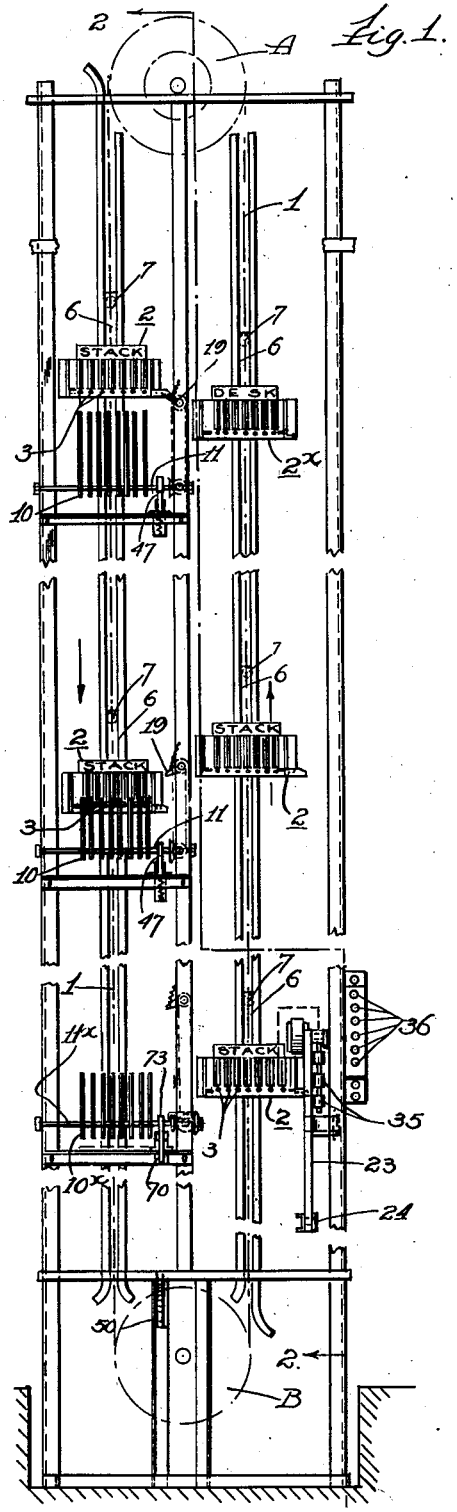
Fig. 1 is a front elevation of a vertically disposed conveyer system embodying this invention but showing only the portions associated with the head wheel, the foot wheel and two intermediate portions, indicating somewhat diagrammatically the single loading station and three discharge or delivery stations.

The vertical conveyer or elevator chosen for purposes of illustration includes a head wheel A and a foot wheel B with a single chain 1 trained over said wheels and normally operating continuously in one direction. The chain 1 supports a plurality of trays or carriers 2 attached at intervals to the chain and each comprising a series of spaced load-supporting arms 3 extending from a back wall 4 and between side walls 5, 5. At each side of the carrier the extreme load-supporting arms 3ª may be angle members to which the side walls 5 are secured, and, as shown, the intermediate arms 3 are of round rod-stock. Thus the front edge of the carrier is left open so that a load carried on the arms 3 and 3ª may be slidably discharged by horizontal movement over these arms. The back wall 4 is attached to a vertically extending hanger 6 which, in turn, is attached at its upper end to the chain 1 as by means of a pivot 7. Vertically extending guide plates 8 and angles 9 form a channel in which the chain 1 and the hangers 6 of the carriers travel.

At each of the several floors at which loads are to be discharged there is provided an unloader consisting of a series of arms 10 spaced at intervals along a horizontal shaft 11 which is journaled just in front of the path of the carriers on the downwardly traveling portion of the conveyer. The shaft 11 carries a bevel gear 12 which meshes with a bevel gear 13 on a transversely extending shaft 14. The shaft 14 carries a chain sprocket 15 connected by a chain 16 to a similar sprocket 17 on a parallel shaft 18 disposed above the shaft 14. The shaft 18 has secured to it a trip arm 19 projecting toward the path of the carriers so that any suitable selector member on one of the carriers, positioned to encounter the arm 19 will rock the arm downwardly, as the carrier passes, thus turning the shaft 18 and simultaneously rocking the shafts 14 and 11 to swing the spaced arms 10 of the unloader into the inclined position at which they are illustrated in Fig. 4. The arms 10 are positioned to intermember with the arms 3 and 3ª of the carriers so as not to interfere with the travel of the latter, but when thus disposed at inclined position, as shown in Fig. 4, the arms 10 will encounter any load on the carrier arms 3 and will shift and discharge the load as the carrier descends past the arms 10.

Figure 2:
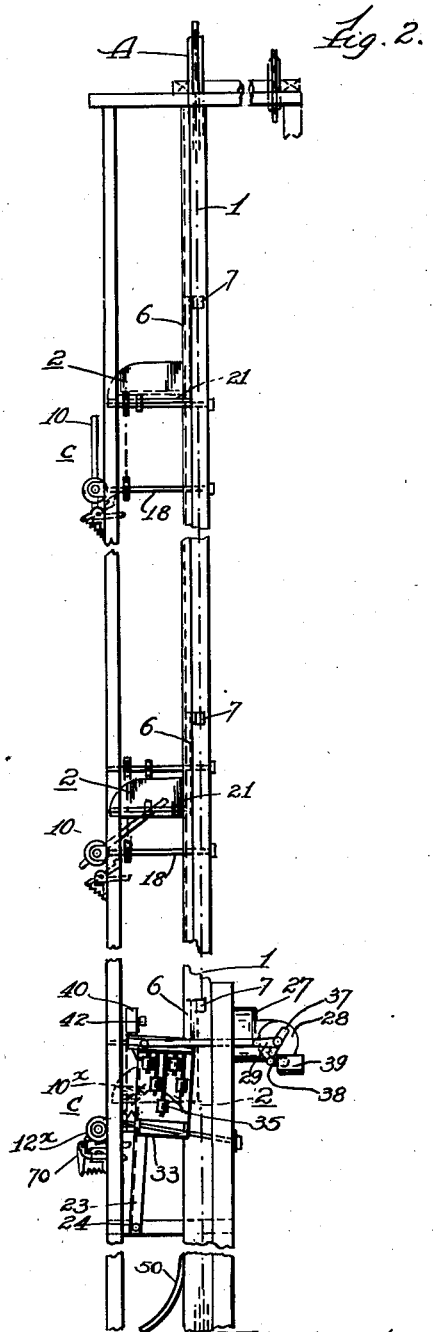
Fig. 2 is a diagrammatic elevation of certain parts shown in Fig. 1, being taken substantially as indicated at line 2—2 on Fig. 1.

It may be understood that each station at which loads are to be discharged is provided with a rock shaft 11 and load-discharging arms 10 normally standing in vertical position, as seen at C, in Fig. 2, and that at the several discharge stations the trip arms 19 are positioned respectively in different vertical planes, that is, at different distances along their shafts 18 as measured from the front face of the elevator shaft, so that a selector device on a given carrier positioned to encounter one of the trip arms 19 will not engage any of the other trip arms 19 along the path of the carriers in the down-run portion of the conveyer.

Figs. 4 and 5 show a selector member 20 as associated with one of the trays or carriers of the conveyer. This selector is in the nature of a lug slidably carried on a pair of parallel guide rods 21 secured to one side of the carrier. Each carrier is provided with one of these selector lugs 20 and each of said lugs may be adjusted to any desired position along the length of the guide rods 21 thus providing enough separate positions of the lug 20 to correspond with several delivery stations on the down-run side of the conveyer.

For shifting the selector lug 20 of any carrier to a desired position on the guide rods 21 I provide a cam bar 23 fulcrumed near its lower end at 24 on a cross-member 25 of the fixed framework, and extending vertically alongside the path of the carriers on the ascending side of the conveyer. Preferably, the bar 23 is an angle member disposed with its flange 23ª extending past the plane through which the lugs 20 of the carriers project as they travel upward. Thus, by swinging the bar 23 to an inclined position its flange 23ª may be caused to act cam-wise upon the next approaching lug 20 so as to shift it along its guide rods 21 to a position determined by the upper end of the shifter bar 23 as adjusted for this purpose.

The bar 23 is held normally at one limit of its range by means of a spring 26. An electric motor 27 fixedly mounted with respect to the frame-work of the conveyer is provided with a non-reversible, speed-reducing gearing, such as a worm drive, not shown, but which may be understood as enclosed within a suitable housing 28 mounted on the motor frame, and through such gearing the motor drives a crank arm 29 connected to one end of a pitman 30. The other end of the pitman is coupled to a block 31 which is slidable between guide rails 32 at the upper end of a plate 33 rigidly attached to the bar 23 so as to move with it about its fulcrum pivot 24. The stroke of the pitman 30 in one direction corresponding to a half revolution of the crank arm 29 is sufficient to swing the bar 23 to such an angle that it would cam the selector lug 20 from its initial position to its extreme position near the opposite end of its guide rods 21; but for adjusting the lug 20 to operate the unloading mechanisms at intermediate stations, it must be shifted less than this full stroke. Accordingly, the lower guide rail 32 for the traveling block 31 is formed with a series of apertures, each serving to guide a stop pin 34 which may be projected upwardly into the path of the block 31. Each stop pin is directly operable by the plunger of an individual solenoid 35 so that the energizing of one of these solenoids, lifting its stop pin 34 into the path of the block 31 determines how far the block will travel in the guideways 32 before it begins to swing the plate 33 and the bar 23 about the pivot 24. A bank of push-buttons 36 is conveniently mounted at the loading station, and each push-button serves as a switch for one of the several solenoids 35; and, in addition, each push-button is wired to serve as a starting switch for the motor 27 which normally stands at rest with the crank arm 29 extending toward the bar 23 as shown in Fig. 6. When any one of the push-buttons 36 is actuated, the corresponding solenoid 35 projects its stop pin 34 upwardly, and as the motor 27 begins to operate the block 31 is drawn toward and into engagement with the upstanding stop pin 34. After such engagement the movement of the pitman 30 causes the bar 23 to swing about its fulcrum 24 into inclined position. When the crank 29 has completed a half revolution, one of the switch arms 37 carried on the same shaft as the crank 29 engages the lever 38 of a limit switch 39 in the motor circuit, and causes the motor to stop. Thus the bar 23 is held at inclined position and at an angle determined by the particular stop pin 34 which was projected by the selected push button 36 and as the approaching carrier moves upwardly past the bar 23 its laterally projecting selector lug 20 will be shifted along the guide rods 21 and left at a position determined by the angle of the bar 23. During this portion of the travel of the carrier, or just subsequent thereto, a load is placed upon its arms 3 and 3ª and the carrier proceeds upwardly to the top of the elevator, around the head wheel A and downwardly at the descending side. When its lug 20 encounters the particular trip arm 19 with which it is set to register, it will actuate said arm, and thus swing the corresponding unloader bars 10 into their active, inclined position, as shown in Fig. 4, for discharging the load from the carrier at the chosen station.

Just above the upper end of the bar 23 there is mounted on the plate 33 a limit switch 40 which is also in circuit with the motor 27 and whose actuating arm 41 with its roller 42 extends into the path of the selector lug 20 as it leaves the bar 23. When the lug 20 strikes the roller 42 in the upward travel of the carrier, the switch 40 is temporarily closed and starts the motor 27 causing another half turn of the crank arm 29 which serves to return block 31 to its initial position, and allows the spring 26 to return the bar 23 to its normal position. At the completion of this half revolution the other arm 37 engages the lever 38 of the limit switch 39 arresting the motor 27.

For actuating the selector mechanism one of the push-buttons 36 is depressed momentarily. This allows time enough to start the motor 27 and the operation of the motor will be maintained thereafter through the limit switch 39 until one of the arms 37 again contacts the lever 38 of that switch. But the momentary electrical impulse would not hold the selected solenoid 35 and stop pin 34 in projected position long enough for the pin to engage the traveling block 31. Therefore, each of the stop pins 34 is formed with two notches near its upper end, which provide shoulders 34ª and 34ᵇ which are vertically offset for a purpose to be explained. When the pin 34 is first projected upwardly by its solenoid, the notched portion of the pin, being narrower than the remainder, is shifted in the aperture of the guide plate 44 so that the shoulder 34ª lodges upon the upper surface of the plate 44. This action is insured by providing each of the stops 34 with a spring 45 pressing against it, as seen in Fig. 7. When the traveling block 31 collides with the upstanding end of the pin 34 it shifts the narrowed portion of the pin in the aperture of the guide plate 44 disengaging the shoulder 34ª from the surface of the plate, and allowing the pin to drop slightly, so that its other shoulder 34ᵇ rests upon the plate adjacent the aperture. This position is maintained throughout the remainder of the half stroke of the pitman 30 by which the cam bar 23 is shifted to the desired inclined position; but during the return stroke, when the block 31 moves away from the stop pin 34 the spring 45 will shift the pin to disengage its shoulder 34ᵇ from the top of the guide plate, and allow the pin to drop back to normal position. This makes it unnecessary to maintain a continuous energizing current in the selected solenoid 35 and correspondingly simplifies the electrical portion of the mechanism.

Thus, when a load is placed upon any of the upwardly traveling carriers it is only necessary to press one of the buttons 36 at the loading station to determine the station at which the load will be automatically delivered as the carrier traverses the descending portion of the conveyor. At each of the delivery stations the spaced arms 10 of the unloading device are held normally, but yieldingly, in upright position by means of a tension spring 46 connecting the arm 19 with a stationary part of the conveyor frame, as seen in Fig. 3. When the selector lug 20 engages the arm 19 depressing it and rocking the members 10 into inclined position, a spring-pressed detent 47 engages a short arm 48 on the shaft 11, to retain said members 10 in active, inclined position. Then, after the load of the carrier has been discharged by the inclined members 10 a lug 60 on the carrier, in its downward travel, strikes a trip arm 49 which is connected to the detent 47 and thus swings the detent out of engagement with the arm 48 allowing the spring 46 to return the unloader mechanism to normal position with its members 10 standing upright, as shown in Fig. 2.

Since the selector lug 20 is positioned to register with only one of the trip arms 19 which actuate the several unloading devices, it will have no further effect as the carrier travels beyond the station at which its load is discharged, and as this carrier approaches the foot wheel B an incilned cam rail 50 engages the selector lug 20 and shifts it back to its initial position on the guide rods 21. The carrier is thus prepared to receive a new load, and the selector is ready to be reset for discharging that load at any chosen delivery station in the system.

Thus far the conveyer has been described as though the loading station at which books are placed on the carriers for return to the stack floors were the only point at which the carriers might be loaded. However, when used as library equipment, it is possible to make the conveyer serve also for delivering books from the several stack floors to the floor at which books are delivered for use; ordinarily, this will be the same floor at which the books are returned after use and loaded onto the conveyer for delivery to the stacks. To adapt the same conveyer for both uses simultaneously, a portion of the carriers, for example, every third carrier, may be designated and plainly marked so as to be reserved for the service of delivering books from the stacks to the desk while the remainder of the carriers may be marked for the other service of returning the books from the desk to the stacks. As an example of such marking, Fig. 1 shows the carriers 2 marked "Stacks", and one of the carriers 2ˣ marked "Desk". If the station at which books are to be delivered by the carrier 2ˣ happens to be the lowest station in the series at the descending side of the conveyer, the load discharging arms 10ˣ at this station may be left permanently at their inclined or active load-discharging position. As the carriers pass this station only the carriers 2ˣ marked "Desk", will normally have any books left on them, since all the other carriers marked "Stacks" will have discharged their loads at some one of the stack floors above the desk station. Books intended for delivery to the desk will be placed on the carriers 2ˣ at the various stack floors.

However, in many libraries in which the stacks occupy several floors, there are stack floors below the desk floor. In such cases the unloader arms 10ˣ at the desk floor, will stand normally at their active position, as indicated in dotted lines in Fig. 10, but their rock shaft 11ˣ will be connected by suitably arranged bevel gears 12ˣ and 13ˣ and by a chain 16ˣ with a shaft 18ˣ having a trip arm 19ˣ similar to the trip arms 19 at the other delivery stations. However, the relation of the bevel gears 12ˣ and 13ˣ is such that depression of the arm 19ˣ will operate to swing the unloader arms 10ˣ to vertical or inactive position, as shown in full lines in Figs. 9 and 10. And the arm 19ˣ is fixed on the shaft 18ˣ at a position to be engaged by the selector lug 20 of any carrier 2 which is transporting a load to be delivered at a station below the desk floor. If there are several stations thus located, the trip arm 19ˣ may be made wide enough to engage lugs 20 adjusted for any of these stations, so that as the corresponding loaded carriers 2 approach the desk floor station, the arm 19ˣ will be swung downwardly, and will actuate unloader arms 10ˣ to move them to inactive position and thus allow the loaded trays to pass without discharging their contents.

For holding the arms 10ˣ in vertical position, a pivoted catch 70 is shown in Fig. 10, carried on a bracket 71 and provided with a spring 72 which causes it to automatically engage the catch arm 73 on shaft 11ˣ. The lug 60 which projects from one side of each of the carriers 2 will encounter the projecting end 70ª of the catch arm as the carrier passes the desk station, and will thus release the unloader arms 10ª and allow them to be swung back to active inclined position by the force of the spring 46ˣ associated with the trip arm 19ˣ. With this arrangement the carriers 2ˣ which are designated for "Desk" service only, need not be equipped with selector lugs 20 since they will not need to actuate any of the trip arms 19 or 19ˣ; but to render the system flexible they may be equipped with guide rods 21 and selectors 20 so that if experience requires, a different proportion of carriers may be assigned to desk service and stack service respectively.

Fig. 11 relates to a modified construction for adapting the same conveyer to serve both for returning books to the stacks and delivering books from the stacks to the reading room desk. With this arrangement the unloading device at the desk station would be identical with those at the stack floors, so that, normally, its unloading arms 10 would stand upright at inactive position, as shown in dotted outline in Fig. 4. But certain carriers, preferably at regular intervals—for example, every third carrier on the chain 1—instead of having adjustable selector lugs 20 will be equipped with a fixed lug 20$^y$ as shown in Fig. 11, to cooperate with a trip arm 19$^y$ on the rock shaft 18$^y$ at the "desk" station. Thus, whenever one of these special carriers, reserved for desk delivery service, passes the rock shaft 18$^y$ adjacent the desk delivery station, it will automatically shift the unloader arms 10 into active position, whether there is a load on the carrier to be discharged or not. A possible objection to this arrangement is that it might result in excessive actuation of the unloader mechanism at the desk station; but since the trip arm 19$^y$ will be assigned to a definite position, different from the position of any other trip arm of the system, it will never be actuated by any of the carriers assigned to the work of returning books to the stacks.

If the "stack" trays and "desk" trays are equal in number, and arranged alternately on the chain 1 it will be a simple matter in routing trays to the stacks for the librarian to simply watch the loading window at the desk floor and as a tray marked "desk" passes the window he will push one of the buttons 36 which determines where the next following tray (which will be a stack tray) will be automatically unloaded. But if the proportion is different, for example, with every third carrier assigned to desk service, then the stack trays may carry additional labels, such as "No. 1" and "No. 2". Then, for routing books to the stacks, the operator will watch the trays moving upward past the loading window at the desk floor; and if the tray passing the window is marked "Desk", or is a stack tray "No. 1", he will operate one of the selector buttons 36 noting that the next following tray, whose selector lug will be affected thereby, will be a tray assigned to stack service, that is, either stack "No. 1" or "No. 2". It will be evident that various other modes of designating the several trays may be adopted to assist the operator in the use of the system.

With either arrangement, which reserves certain carriers for "desk" service only, there is a possibility that these carriers may be erroneously loaded with books intended for the stacks, but this will only result in having such books promptly carried over the head wheel A and delivered back to the point from which they started, namely, the delivery desk, where the error will be promptly noted, so that the books can be properly routed to the stacks by way of carriers assigned to that service.

I claim:

1. A conveyer system including a plurality of delivery stations, a conveyer having a load carrier arranged to traverse said stations, a normally inactive unloading device at each delivery station having a trip member operable to shift it to active position, the several trip members being positioned to register respectively with different points on the carrier as it passes, a shiftable selector slidably adjustable on the carrier for engagement with any one of said trip members, a cam bar mounted adjacent the path of the carrier and movable to a position in which it extends obliquely across the path of the selector for shifting it as it traverses the bar, a slider having a uniform travel transversely of the cam bar and a plurality of abutment pins carried by the bar and disposed in a series adjacent the path of the slider, with means for selectively projecting any one of said pins for encounter by the slider to determine the point to which the cam bar shall be moved by the slider.

2. In the combination defined in claim 1, the means for projecting said pins comprising a plurality of electro-magnetic devices, a source of electrical energy therefor and a separate manual switch for each of said devices for connecting it with said energy source at will.

3. In the combination defined in claim 1, the means for projecting said pins comprising a plurality of electro-magnetic devices, a source of electrical energy therefor and a separate manual switch for each of said devices for connecting it with said energy source at will, together with an electric motor connected to actuate the slider, and conductors connecting said motor with each of said manual switches, whereby actuation of any of said switches starts the motor and causes one of the abutment pins to be projected for encounter with the slider.

4. In the combination defined in claim 1, the means for projecting said pins comprising a plurality of electro-magnetic devices, a source of electrical energy therefor and a separate manual switch for each of said devices for connecting it with said energy source at will, an electric motor connected to actuate the slider, conductors connecting said motor with each of said manual switches, an auxiliary switch which automatically maintains the motor circuit for a predetermined period sufficient to complete the travel of the slider in one direction, and mechanical means automatically holding the projected pin in projected position after the corresponding manual switch is opened, whereby only momentary actuation of the manual switch is necessary.

5. In the combination defined in claim 1, the means for projecting said pins comprising a set of electro-magnetic devices, a source of electrical energy therefor and a separate manual switch for each of said devices for connecting it with said energy source at will, an electric motor connected to actuate the slider, conductors connecting said motor with each of said manual switches, automatic means operated by the motor including an auxiliary switch which maintains the motor circuit independently of the manual switch after the motor is started and opens said circuit upon completion of the slider movement in one direction, and a second auxiliary switch actuated by the carrier after it has traversed the cam bar, said switch having connection with the motor and with the energy source, whereby it serves to re-start the motor for moving the slider in reverse direction.

6. In the combination defined in claim 1, the means for projecting said pins comprising a plurality of electro-magnetic devices, a source of electrical energy therefor and a separate manual switch for each of said devices for connecting it with said energy source at will, an electric motor connected to actuate the slider, conductors connecting said motor with each of said manual switches, an auxiliary switch which automatically maintains the motor circuit for a predetermined period sufficient to complete the travel of the slider in one direction, mechanical means automatically holding the projected pin in projected position after the corresponding manual switch is opened, whereby only momentary actuation of the manual switch is necessary, and means independent of said motor, operating to return the cam bar to its initial position.

7. In the combination defined in claim 1, the means for projecting said pins comprising a plurality of electro-magnetic devices, a source of electrical energy therefor and a separate manual switch for each of said devices for connecting it with said energy source at will, an electric motor connected to actuate the slider, conductors connecting said motor with each of said manual switches, an auxiliary switch which automatically maintains the motor circuit for a predetermined period sufficient to complete the travel of the slider in one direction, mechanical means automatically holding the projected pin in projected position after the corresponding manual switch is opened, whereby only momentary actuation of the manual switch is necessary, and means automatically releasing the projected pin for return to its initial position upon disengagement of the slider from the said pin.

8. A conveyer system including a series of regular delivery stations and one special delivery station interposed in the series, a conveyer arranged to traverse said stations and having a regular load carrier designated for transporting loads to the regular stations and a special carrier designated for transporting loads to the special station, a normally inactive unloading device at each regular station, a normally active unloading device at the special station having a trip member operable to shift it to inactive position, and means on the regular carrier engageable with the trip member of the unloading device at the special station for shifting said device to inactive position to avoid discharging the load of said carrier at the special station.

9. A conveyer system including a series of regular delivery stations and one special delivery station interposed in the series, a conveyer arranged to traverse said stations and having a regular load carrier designated for transporting loads to the regular stations and a special carrier designated for transporting loads to the special station, a normally inactive unloading device at each regular station having a trip member operable to shift it to active position, a normally active unloading device at the special station having a trip member operable to shift it to inactive position, the several trip members of the regular stations being positioned to register respectively with different points on the regular carrier as it passes, and a shiftable selector on said carrier adjustable to any of said points to engage any chosen trip member, the trip member at the special station being positioned and dimensioned to be engaged by said selector when the latter is adjusted for a regular station located beyond the special station in the series.

10. A conveyer system including a series of regular delivery stations and one special delivery station interposed in the series, a conveyer arranged to traverse said stations and having a regular load carrier designated for transporting loads to the regular stations and a special carrier designated for transporting loads to the special station, a normally inactive unloading device at each station having a trip member operable to shift it to active position, the several trip members of said stations being positioned to register respectively with different points on the regular carrier as it passes, a shiftable selector on said regular carrier adjustable to engage the trip member of any chosen regular station, and a trip member on the special carrier permanently positioned to engage only the trip member of the special station.

SAMUEL OLSON.